United States Patent [19]

Liou et al.

[11] Patent Number: 4,917,798
[45] Date of Patent: Apr. 17, 1990

[54] METHOD OF FABRICATING A PERFORATED PLATE FOR A HOLLOW FIBER SEPARATOR APPARATUS, AND DEVICES OBTAINED THEREBY

[75] Inventors: Jun K. Liou, Beynost; Philippe Aptel, Toulouse, both of France

[73] Assignee: Lyonnaise Des Eaux, Paris, France

[21] Appl. No.: 326,533

[22] Filed: Mar. 21, 1989

[30] Foreign Application Priority Data

Mar. 29, 1988 [FR] France .................. 88 04067

[51] Int. Cl.$^4$ .............................................. B01D 13/00
[52] U.S. Cl. .................................. 210/321.89; 210/450
[58] Field of Search ................. 210/450, 456, 321.9,
210/321.8, 321.89; 55/16, 158; 264/258

[56] References Cited

U.S. PATENT DOCUMENTS

| | | | |
|---|---|---|---|
| 3,228,877 | 1/1966 | Mahon | 210/321.8 X |
| 3,616,928 | 11/1971 | Rosenblatt | 210/321.9 X |
| 4,308,654 | 1/1982 | Boeart | 55/16 X |
| 4,430,219 | 2/1984 | Kuzumoto et al. | 210/321.88 |

Primary Examiner—Frank Spear
Attorney, Agent, or Firm—Amster, Rothstein & Ebenstein

[57] ABSTRACT

A method of fabricating a tube plate for a hollow fiber separator apparatus, from a set of hollow fibers with an end of the set being embedded in a resin, wherein the set of hollow fibers is subdivided into a plurality of elementary bundles, at least a first end of each elementary fiber is enclosed in a reinforcing element and the first ends are stuck together using a resin in order to form a reinforced tube plate. The invention also relates to tube plates and to hollow fiber separator devices.

11 Claims, 2 Drawing Sheets

METHOD OF FABRICATING A PERFORATED PLATE FOR A HOLLOW FIBER SEPARATOR APPARATUS, AND DEVICES OBTAINED THEREBY

The invention relates to a method of fabricating a tube plate for a hollow fiber separator apparatus, and to devices obtained by the method.

BACKGROUND OF THE INVENTION

In numerous separator devices making using of permeation through a membrane (microfiltration, ultrafiltration, reverse osmosis, gaseous permeation, dialysis, pervaporation, ...), the membrane is in the form of hollow fibers bundled together in ordered manner or otherwise with at least one end of the bundle being embedded in a resin support referred to as a tube plate. The bundle of fibers is normally initially in the form of a hank with at least one end being embedded in the resin and is transformed into a bundle during the subsequent operation of putting the hollow fibers into communication with the outside, by slicing the tube plate of by cutting off the loops of fiber projecting therefrom. In order to give the required strength to the plate, and in particular strength to withstand the pressure differences applied between the two faces of the tube plate, it is necessary to increase the thickness of the plate, thereby loosing a corresponding length of useful fiber length, or else to add reinforcing devices to the plate, with various different types of reinforcing device being known.

In addition, French patent number FR-2 380 051 describes a tube plate which is pierced by a network of passages extending perpendicularly to the fibers. This technique requires an additional stage during which the passages are pierced after the tube plate has been fabricated.

SUMMARY OF THE INVENTION

The present invention provides a method of fabricating a tube plate for a hollow fiber separator apparatus, from a set of hollow fibers whose end is embedded in a resin, in which the tube plate can be reinforced in a manner which is simple and effective without an additional step of piercing the resin.

The method of the invention consists in subdividing the set of hollow fibers into a plurality of elementary bundles. which are advantageously in the form of hanks, in enclosing at least a first end of each elementary bundle in a reinforcing element, in sticking said first ends together using a resin in order to form a reinforced tube plate, and in putting the hollow fibers into communication with the outside in a manner known per se.

In an advantageous implementation, the reinforcing elements extend over the entire length of said elementary bundles up to their second ends which may be stuck together to form a second, reinforced tube plate.

The invention also provides a tube plate for a hollow fiber separator apparatus formed by gluing the end of a bundle of hollow fibers by means of a curable resin, wherein the plate includes reinforcing elements embedded in the resin and surrounding respective ends of a plurality of elementary bundles which together make up the bundle of hollow fibers.

The invention also provides a hollow fiber separator device comprising a plurality of hollow fiber bundles contained in respective perforated sleeves which are embedded at both ends in tube plates formed at the two ends of the bundles.

Another variant provides a hollow fiber separator device comprising a plurality of bundles of hollow fibers attached to a rigid riser interconnecting the perforated sleeves situated at the opposite ends of the bundles and embedded in the tube plates.

These reinforcing elements are preferably perforated sleeves of circular or polygonal right cross-section.

BRIEF DESCRIPTION OF THE DRAWINGS

Implementations of the invention are described by way of example with reference to the accompanying drawings, in which.

MORE DETAILED DESCRIPTION

Figure 1:
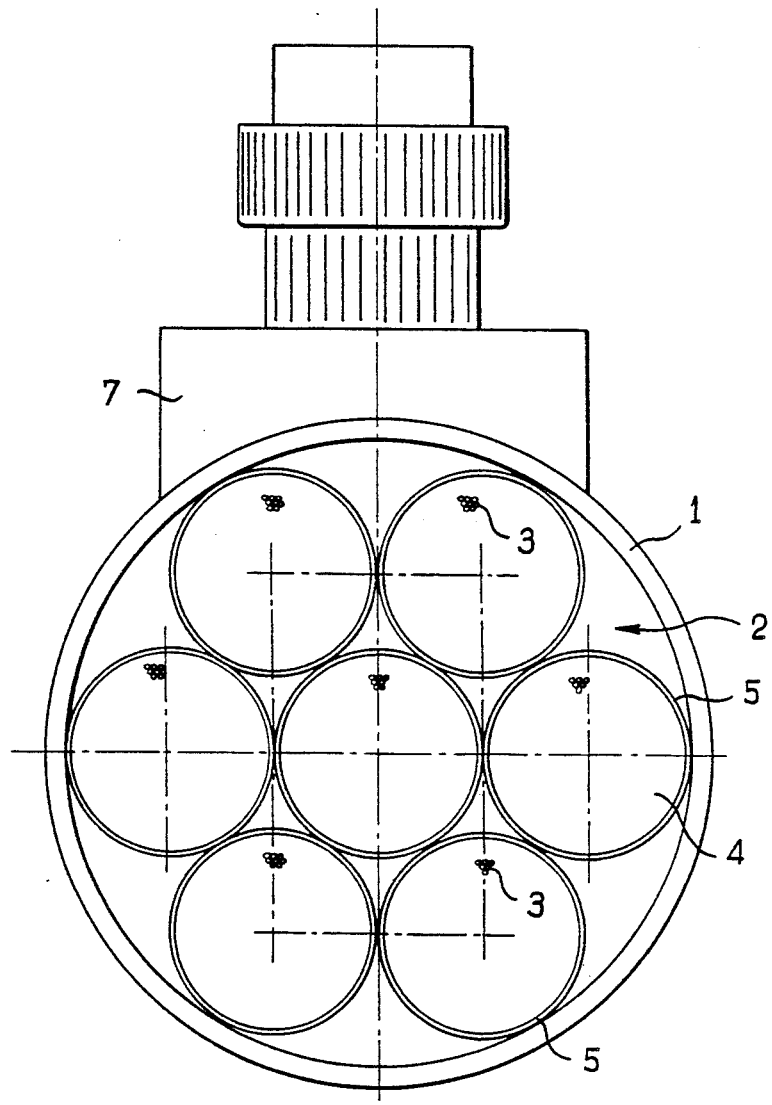
FIG. 1 is a plan view of one embodiment of a tube plate in accordance with the invention.

FIG. 1 is a plan view of a tube plate in accordance with an embodiment of the invention, and the invention is naturally not limited to this particular embodiment as shown.

In a manner which is conventional and therefore not described in detail, the assembly constituted by the fibers and the tube plate(s) is mounted in a generally cylindrical envelope into which the fluid to be treated is inserted either to pass from the outside towards the inside of the fibers so as to escape in purified form beyond the outlet tube plate, or else so that it passes from the inside towards the outside of the fibers leaving in purified form between the inlet tube plate and the other end which may be constituted by another tube plate, or otherwise.

In FIG. 1, the envelope 1 contains a tube plate 2 constituted by a resin, e.g. an epoxy resin, which sticks together hollow fiber ends 3. Instead of having a single bundle of fibers obtained by cutting a single hank of fibers at its ends, the tube plate of the present invention contains a plurality of elementary bundles 4 of fibers 3 (with only a few fibers being shown in order to avoid overcrowding the figure) with the elementary bundles being distinct from one another and being separated by reinforcing elements 5 which surround each of them. In this case, the right cross-section of the reinforcing elements 5 is circular, and there are seven of them, thereby enabling them to be disposed in a relatively compact configuration. Other cross-sections could naturally be envisaged, for example they could be polygonal and in particular hexagonal or octagonal in order to facilitate obtaining a relatively compact configuration.

The reinforcing elements 5 which are described below as being circular in section for reasons for convenience, are constituted by tube sleeves which surround the ends of the bundles of fibers and are made in the form of grids, gratings, or lattices of a material which is sufficiently rigid in order to obtain the desired strength (e.g. metal or plastic materials). One particularly advantageous form is shown diagrammatically in FIG. 2. This form comprises a cylinder which is regularly perforated by close-together holes 6 of arbitrary shape, e.g. circular. The open space ratio, the shape, the distribution, the number, and the size of the mesh are all determined as a function of the desired flow rate and flow distribution. The spacing between the mesh holes is designed to ensure that the sleeve remains strong enough.

Such sleeves constitute a very simple means for avoiding any deformation of the tube plate under the effect of pressure differences between the two faces of the plate.

Figure 2:
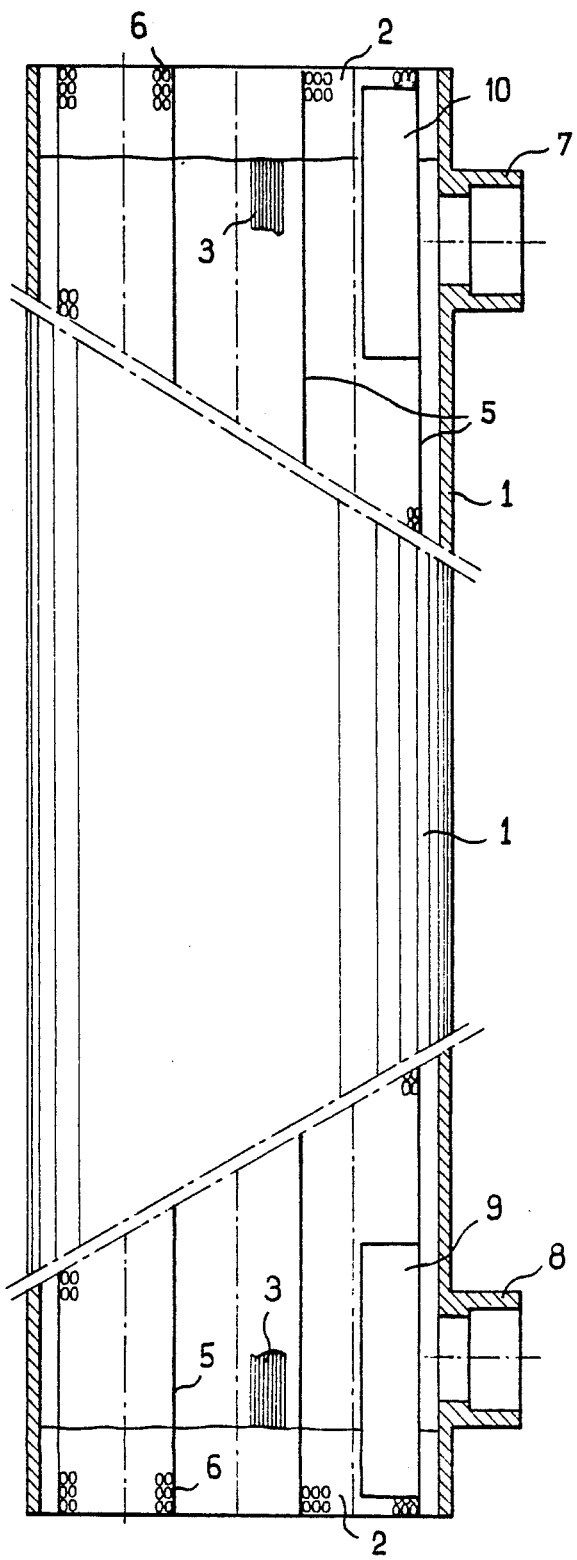
FIG. 2 is a side view in partial section of a separator device in accordance with the invention.

In a particularly advantageous embodiment, the sleeves embedded in the outlet tube plate extend beyond said plate over the entire length of the elementary bundles as far as their second ends which are stuck together to form a second tube plate. This is shown in FIG. 2, in which an envelope 1 contains a plurality of sleeves or reinforcing elements 5 which are perforated by holes 6 surrounding a plurality of elementary bundles of fibers 3 each of which is terminated at each end in a tube plate.

In this case, the two tube plates interconnected in this way by the reinforcing elements are better able to withstand the compression or traction forces to which they are subjected due to the pressure difference which exists between the inside and the outside of the envelope.

In addition, such a disposition facilitates installing the hollow fibers in the envelope and facilitates the flow of fluid at the outside of the fibers with the fluid merely having to find a tortuous path between the fibers after which it can flow freely in the spaced between the sleeves 5, thereby considerably reducing head losses.

The envelope 1 is connected to a network for the fluid to be treated either via its ends, or else via an inlet duct 8 and/or an outlet duct 7. Whichever disposition is used, the presence of sleeves subdividing the set of hollow fibers gives rise to better fluid distribution since free passages are available between the sleeves. In addition, the fact of having an assembly of several bundles means that empty spaces are left at the inside periphery of the envelope which means that fluid inlets/outlets can be put into place by a suitable choice of diameters for the sleeves and for the envelope such that fluid flow is facilitated and excessive head loss avoided. Further, baffles 9 may be provided level with said inlets and/or outlets in order to provide local protection of the bundle from the hydraulic forces generated by the restrictions of these inlets and/or outlets.

In the example shown in FIG. 2, a baffle 9 is provided level with the inlet duct 8, and a baffle 10 is provided level with the outlet duct 7 essentially for the purpose of protecting the bundle.

Purely by way of illustration, the device shown in FIG. 2 may have the following characteristics:

| Envelope 1: | |
| --- | --- |
| outside diameter: | 250 mm |
| inside diameter: | 240 mm |
| length: | 1.3 m |
| Perforated sleeves 5: | |
| outside diameter: | 80 mm |
| inside diameter: | 75 mm |
| aperture size: | 4 mm |
| Number of elementary bundles: | 7 |
| Filter area: | 40 m$^2$ |

When the fluid to be treated passes from the outside to the inside of the fibers, the perforated sleeves may also be used to support a prefilter (as in a multiple tube filter), thereby performing prefiltering.

In another embodiment, the separator device may be constituted by a plurality of bundles of hollow fibers attached to a rigid riser (rod or bar) which is fixed to the two sleeves on each elementary bundle and which holds them apart. The bundle is kept on the riser e.g. by a tape or cloth which is wound spirally thereabout in order to individualize each bundle.

In order to prepare a tube plate in accordance with the invention, a plurality of hanks of hollow fibers are prepared which are small in diameter compared with the hanks normally used so as to subdivide the set of hollow fibers into a plurality of elementary bundles, after which a perforated sleeve is fitted over at least one of the ends of each hank, and the sleeves are disposed in the desired configuration in order to enable them to be stuck together with an appropriate resin.

When the sleeves extend over the entire length of the elementary bundles or when they are interconnected by a rise, the opposite ends of the perforated sleeves are also stuck together.

Sticking may be done, for example, by potting the ends of the bundles in a mold or by applying resin by centrifuging. Each bundle end may be stuck individually to its sleeve, essentially for testing prior to final assembly, and then all of the bundles and sleeves may be assembled by a second gluing operation. It is also possible to mount the sleeves removably in the tube plate in order to enable them to be dismantled, e.g. for maintenance purposes.

The use of perforated sleeves in the tube plate makes it possible to secure the sleeves firmly in the resin since the resins passes through the perforations and ensures intimate bonding. In addition, subdividing the fibers into a plurality of bundles also makes it easier for the resin to penetrate during gluing.

In addition, the use of a plurality of smaller-diameter hanks, which therefore have a smaller radius of curvature at their ends, also reduces the loss of material during fabrication due to that portion of the fibers which is cut off.

We claim:

1. A method of fabricating a tube plate for a hollow fiber separator apparatus, from a set of hollow fibers whose end is embedded in a resin, comprising the steps of subdividing a set of hollow fibers into a plurality of elementary bundles, enclosing at least a first end of each elementary bundle in a rigid reinforcing element, and sticking said first ends together using a resin in order to form a reinforced tube plate.

2. A method according to claim 1, wherein said reinforcing elements extend over the entire length of said elementary bundles up to their opposite ends which are glued together in order to form a second tube plate.

3. A method according to claim 1 or 2, wherein said reinforcing elements are perforated sleeves having a circular or a polygonal right cross-section.

4. A tube plate for a hollow fiber separator apparatus formed by gluing the end of a bundle of hollow fibers by means of a curable resin, wherein the plate includes reinforcing elements embedded in the resin and surrounding respective ends of a plurality of elementary bundles which together make up the bundle of hollow fibers.

5. A tube plate according to claim 4, wherein the reinforcing elements are perforated sleeves which are circular or polygonal in right cross-section.

6. A tube plate according to claim 4 or 5, wherein the sleeves extend beyond the tube plate over the entire length of the hollow fiber bundles.

7. A hollow fiber separator device comprising a plurality of hollow fiber bundles contained in respective perforated sleeves which are embedded at both ends in tube plate formed at the two ends of the bundles.

8. A hollow fiber separator device constituted by a plurality of hollow fiber bundles attached to a rigid riser interconnecting perforated sleeves situated at opposite ends of the bundles and embedded in a resin.

9. A method according to claim 1, wherein the reinforcing element is non-porous and is not shrunk during the method steps.

10. A hollow fiber separator device according to claim 7 or 8 wherein the perforated sleeves are rigid.

11. A tube plate according to claim 4 wherein the reinforcing elements are rigid.

* * * * *